Feb. 27, 1962     E. GREEN ETAL     3,022,574
CABLE ARMOR CUTTERS
Filed June 9, 1961
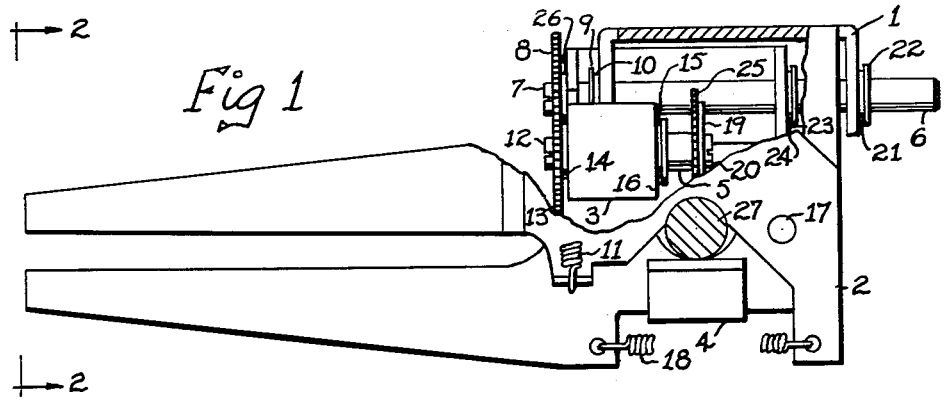
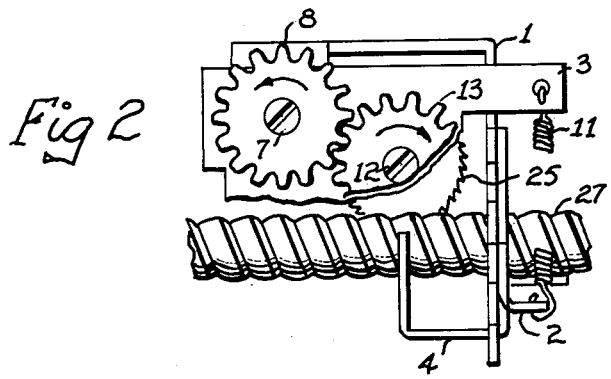
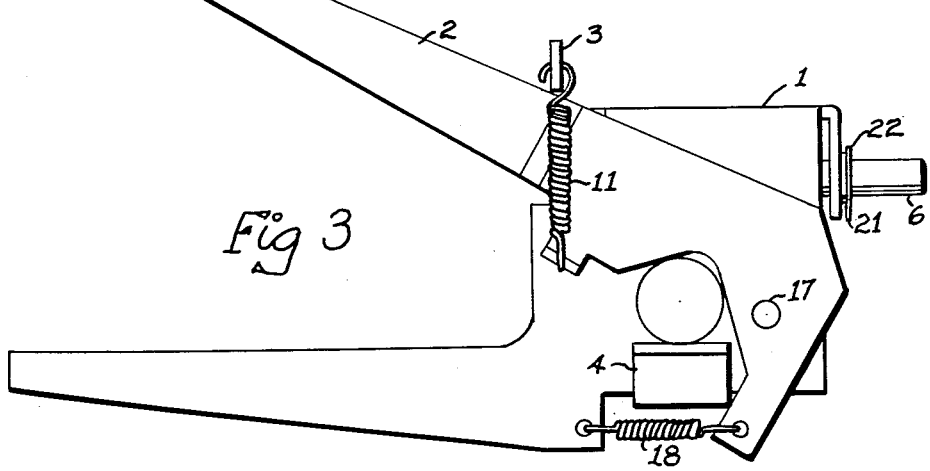
INVENTORS
Samuel Schlesinger
BY Emil Green

United States Patent Office 3,022,574
Patented Feb. 27, 1962

3,022,574
CABLE ARMOR CUTTERS
Emil Green, 15 Union Place, Lynbrook, N.Y., and Samuel Schlanger, 44 Forest Road, Valley Stream, N.Y.
Filed June 9, 1961, Ser. No. 116,008
4 Claims. (Cl. 30—90.5)

This invention relates to new and useful improvements in tools for cutting the armor of spirally wound armored cables.

One object of this invention is to provide a tool which can hold the armor in a fixed clamped position while a rotating saw, either hand driven by a crank or driven by an electric portable drill, cuts the armor to a predetermined depth.

Another object of this invention is to provide a device which has all the holding screws so placed that they will tend to tighten as the saw cuts into the armor and thereby provides a self tightening system so that no parts will loosen due to the torsionally applied forces.

One more object of this invention is to provide a tool that has its parts so placed that any tendency for the rotating saw to dig in will cause the cutter to swing away from the armor and thereby prevent itself from jamming into the armor.

A still further object of this invention is to mount the saw on a pivot arm, so that the cutting force is independent of the driving force, and forces imposed by the weight of the armored cable thereby providing uniform cutting action.

One more object of this invention is to provide a tool that is made in such a manner that when it is in a released position the saw is raised out of range and the clamping means is automatically in an opened position so that the cable can be readily inserted into the tool without damaging the saw and, when the cable is clamped, the saw will then automatically lower itself to the cutting position, thereby making the tool convenient to operate.

Another object of this invention is to provide a device of this character which will be formed of a few strong simple parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

FIGURE 1 is a front elevation view, showing the tool in a clamped position, and with portions broken away to show some of the interior mechanism.

FIGURE 2 is a view in the direction 2—2 of FIGURE 1.

FIGURE 3 is a front elevation view showing the tool in a released position.

Referring to the drawings, numeral 1 designates the main body of this tool and is so made that it also is the stationary bottom part of the clamping handle.

Movable clamping handle 2 is pivoted to the main body 1 by the stud 17 and is held in an open position by the extension spring 18, attached at the other end to main body 1.

Shaft 6 lies in the bushings 21 and 10 in the main body 1 and is retained axially by the spring grip rings 22 and 9. One end of the shaft 6 extends outward to allow a hand crank or portable electric drill chuck to be attached, to power the tool. The other end is tapped for the screw 7. Gear 8 has a clearance hole at its center for the screw 7 and is centered and held against the end of the shaft 6 by the screw 7.

The pivot arm 3 pivots about the shaft 6 on the bushings 24 and 26 and is retained axially by the spring grip ring 23 and the gear 8.

The shaft 5 lies in the bushings 14 and 15 in the pivot arm 3 and has a tapped hole at each end. At one end the circular saw blade 25 and the circular depth stop 19, having a clearance hole for the screw 20, are held to the shaft 5 by the screw 20. At the other end, the gear 13 has a clearance hole for the screw 12 and is held to the shaft 5 by the screw 12. The shaft 5 is retained axially in the pivot arm 3 by the gear 13 and the spring grip ring 16. The extension spring 11 pulls the pivot arm 3 around the shaft 6 and thus forces the circular saw blade 25 against the armored cable 27.

Welded to the bottom of the main body 1 is the cable support 4 which has a V shape cut at one end to center the armored cable 27 under the circular saw blade 25. The other end of the cable support 4 is a platform to support the armored cable 27 while it is clamped by the movable clamping handle 2.

In the operation of the tool, the armored cable 27 is inserted into the cable support 4 while the tool is in an open position as shown in FIGURE 3. The movable clamping handle 2 is then pulled down toward the stationary handle on the main body 1 to a closed position as shown in FIGURE 1. This allows the extension spring 11 to pull the pivot arm 3 down until the circular saw blade 25 engages the armored cable 27.

Power is then applied to the extended end of the shaft 6 in the direction indicated by the arrow and is transmitted to the gear 8 and then to the gear 13 which drives the shaft 5 and in turn the circular saw blade 25.

The circular saw blade 25 will cut until the circular depth stop 19 rests on the top of armored cable 27. This limits the depth of cut.

If at any time during the cutting action, the circular saw blade 25 digs in and tends to stall, it automatically exerts an upward moment on the pivot arm 3 and frees itself, whereupon it engages itself again until it is in a free cutting position.

The screws 7, 12, and 20 are all commercial right hand threaded screws. Any torque transmitted by the action of the tools results in a tightening effect on these screws and thereby keeps them constantly tight.

Upon completion of the cutting action, the movable clamping handle 2 is released. Since the extension spring 18 is stronger than the extension spring 11, the pivot arm 3 is moved up by the action of releasing the movable clamping handle 2 and this carries the circular saw blade 25 away from the armored cable 27, thus allowing easy extraction of the armored cable 27.

From the above description it is thought that the construction and the operation of the invention will be fully understood without further explanation.

What we claim is:

1. A cable armor cutter comprising a main frame, a driving shaft journaled in the main frame, an arm pivoted about the driving shaft of the main frame, driving means on the end of the driving shaft engaged with driving means mounted on a shaft journaled in the pivoted arm, a circular saw blade mounted on the shaft in the pivoted arm, a circular depth stop fastened adjacent to the circular saw blade, means to motivate the driving shaft, means to exert force on the circular saw blade, additional means to clamp the cable, clamping means so arranged that when it is released it removes the circular saw blade from the armored cable, thus allowing the cable to be removed easily.

2. A cable armor cutter comprising a main frame, a driving shaft journaled in the main frame, an arm pivoted about the driving shaft of the main frame, driving means to drive a shaft journaled in the pivoted arm on which is mounted a circular saw blade and a circular depth stop, the circular saw blade so being mounted that when it tends to stall it automatically disengages and engages until free to cut, clamping means for clamping the cable, means for releasing the cable and moving the circular saw blade from the armored cable when in a released position.

3. A cable armor cutter comprising a main frame, a driving shaft journaled in the main frame, an arm pivoted about the driving shaft of the main frame, driving means to drive a shaft journaled in the pivoted arm on which is mounted a circular saw blade and circular depth stop, all driving members being mounted so that the torque exerted by the cutting action tightens the fastening means, clamping means for clamping the cable, means for releasing the cable and saw when in a released position.

4. A cable armor cutter comprising a main frame, a driving shaft journaled in the main frame, an arm pivoted about the driving shaft of the main frame, driving means to drive a shaft journaled in the pivoted arm on which is mounted a circular saw blade and a cutting stop, clamping means for clamping the cable so that the weight of the cable cannot react on the cutting action, motivating power supplied to the driving shaft in the main frame so that the motivating means does not influence the engaging force of the saw which is engaged by its own spring means, means for releasing the cable and the saw when the tool is in a released position.

References Cited in the file of this patent

UNITED STATES PATENTS

| | | |
|---|---|---|
| 2,031,470 | Eck et al. | Feb. 18, 1936 |
| 2,654,941 | Schleimer | Oct. 13, 1953 |
| 2,674,027 | Kosinski | Apr. 6, 1954 |